United States Patent
Roth-Mandutz et al.

(10) Patent No.: US 11,882,555 B2
(45) Date of Patent: Jan. 23, 2024

(54) MOBILE DEVICE AND METHOD

(71) Applicant: KONINKLIJKE PHILIPS N.V, Eindhoven (NL)

(72) Inventors: Elke Roth-Mandutz, Erlangen (DE); Khaled Shawky Hassan Hussein, Erlangen (DE); Shubhangi Bhadauria, Erlangen (DE); Martin Leyh, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 259 days.

(21) Appl. No.: 17/212,725

(22) Filed: Mar. 25, 2021

(65) Prior Publication Data
US 2021/0219309 A1 Jul. 15, 2021

Related U.S. Application Data

(63) Continuation of application No. PCT/EP2019/075872, filed on Sep. 25, 2019.

(30) Foreign Application Priority Data

Sep. 27, 2018 (EP) ..................... 18197357

(51) Int. Cl.
*H04W 4/00* (2018.01)
*H04W 72/121* (2023.01)
(Continued)

(52) U.S. Cl.
CPC ........... *H04W 72/121* (2013.01); *H04W 4/08* (2013.01); *H04W 72/20* (2023.01); *H04W 72/30* (2023.01); *H04W 76/11* (2018.02); *H04W 92/18* (2013.01)

(58) Field of Classification Search
CPC ..... H04W 72/121; H04W 4/08; H04W 72/20; H04W 72/30; H04W 76/11; H04W 92/18;
(Continued)

(56) References Cited

U.S. PATENT DOCUMENTS 8,547,982 B2 10/2013 Al-Absi et al.
2013/0128786 A1 5/2013 Sultan et al.
(Continued)

FOREIGN PATENT DOCUMENTS

CN 107615844 A 1/2018
KR 10-1467761 B1 12/2014
(Continued)

OTHER PUBLICATIONS

3GPP TR 22.886 V16.1.1,, "3rd Generation Partnership Project; Technical Specification Group Services and System Aspects; Study on enhancement of 3GPP Support for 5G V2X Services", Release 16, Sep. 2018.
(Continued)

*Primary Examiner* — Chuong T Ho

(57) ABSTRACT

A mobile device being a member of a communication group and configured to communicate with one or more other members of the communication group and to exchange control information with the one or more other members, wherein the mobile device is configured to create an identification information and to transmit the identification information on a physical layer of the control information, wherein the identification information assigns the communication group.

16 Claims, 3 Drawing Sheets

(51) Int. Cl.
  *H04W 76/11* (2018.01)
  *H04W 4/08* (2009.01)
  *H04W 72/20* (2023.01)
  *H04W 72/30* (2023.01)
  *H04W 92/18* (2009.01)

(58) Field of Classification Search
  CPC ........... H04W 4/70; H04W 4/40; H04W 4/80;
       H04W 4/06; H04W 84/18; G08G 1/22;
       H04L 12/1818; H04L 12/1895; H04L
       12/189; H04L 61/5069; H04L 67/52;
       H04L 12/1845
  USPC .................................................. 370/329, 330
  See application file for complete search history.

(56) References Cited

U.S. PATENT DOCUMENTS

| | | | |
|---|---|---|---|
| 2016/0219636 A1 | 7/2016 | Fujishiro et al. | |
| 2018/0139724 A1* | 5/2018 | Loehr | H04W 72/02 |
| 2018/0146494 A1* | 5/2018 | Khoryaev | H04W 76/15 |
| 2018/0199388 A1 | 7/2018 | Belghoul et al. | |
| 2018/0263026 A1* | 9/2018 | Loehr | H04W 72/02 |
| 2019/0075566 A1* | 3/2019 | Kim | H04W 76/23 |
| 2019/0363843 A1* | 11/2019 | Gordaychik | H04W 72/23 |
| 2020/0008025 A1* | 1/2020 | Lee | H04L 1/1896 |
| 2020/0100048 A1* | 3/2020 | Wu | H04W 4/12 |
| 2021/0306824 A1* | 9/2021 | Li | H04L 1/1819 |
| 2021/0306828 A1* | 9/2021 | Panteleev | H04W 72/0446 |

FOREIGN PATENT DOCUMENTS

| | | |
|---|---|---|
| WO | 2015/029954 A | 3/2015 |
| WO | 2015/032436 A1 | 3/2015 |

OTHER PUBLICATIONS

3GPP TR 36.885 V14.0.0, "3rd Generation Partnership Project; Technical Specification Group Radio Access Network; Study on LTE-based V2X Services;", Release 14, Jun. 2016.

3GPP TS 36.212 V15.2.1, "3rd Generation Partnership Project; Technical Specification Group Radio Access Network; Evolved Universal Terrestrial Radio Access (E-UTRA); Multiplexing and channel coding", Release 15, Jul. 2018.

AT & T, "V2X sidelink design in supporting unicast, groupcast and broadcast", 3GPP TSG RAN WG1 Meeting #94 R1-1809066, Aug. 11, 2018.

Atsuo Hasegawa, "Office Action for JP Application No. 2021-517597", dated May 23, 2022, JPO, Japan.

3GPP TSG RAN WG1 #94 R1-180877S, Samsung, "Discussion on support of unicast, groupcast and broadcast for NR V", pp. 1-2, 20180811, Aug. 20-24, 2018.

Dejie Qiu, "Office Action for CN Application No. 201980078313. X", dated Jan. 5, 2022, CNIPA, China.

Jeong Koo Woong, "Office Action for KR Application No. 10-2021-7012230", dated Dec. 29, 2021, KIPO, Republic of Korea.

* cited by examiner

MOBILE DEVICE AND METHOD

CROSS-REFERENCE TO RELATED APPLICATION

This application is a continuation of copending International Application No. PCT/EP2019/075872, filed Sep. 25, 2019, which is incorporated herein by reference in its entirety, and additionally claims priority from European Application No. EP 18197357.9, filed Sep. 27, 2018, which is incorporated herein by reference in its entirety.

BACKGROUND OF THE INVENTION

Embodiments of the present invention refer to a mobile device using an identification information on the physical layer. Further embodiments refer to a method using an identification information on a physical layer and to a computer program. In general, the invention lies on the technical field of mobile communication having focus on groupcast/group ID management.

Including Rel-15, the LTE based V2X sidelink communication is using broadcast only. Only with Rel-16 (using NR for the sidelink) the advanced use cases in NR such as the vehicle platooning and advanced driving need groupcast based sidelink communication is available [1].

Current solutions are mostly solved at the application layer in the IEEE 802.11p, which may be neither applicable nor fulfill the latency requirements for 5G V2X use cases in Rel 16 [1].

The decision of who is the group or platoon head is usually been tackled in DSRC within the application layer by defining Group ID's in the CAM messages. This is one possibility that can be adapted by the NR-V2X that in the application layer a "Group ID" is defined within the CAM and DENM messages. Only the vehicles that can decode this Group ID become a member of the platoon. This solution however, will lead to a higher delay in decoding the messages and may not fit the stringent latency requirements as these are broadcasted every 100 ms [2]. This will also create issues when the platoon member wants to leave the platoon. Then the information will reach only after 100 ms the remaining platoon members until when the platoon dynamics will have changed. Therefore there is a need for an improved approach.

SUMMARY

An embodiment may have a mobile device being a member of a communication group and configured to communicate with one or more other members of the communication group and to exchange control information with the one or more other members, wherein the mobile device is configured to create an identification information and to transmit the identification information on a physical layer of the control information, wherein the identification information assigns the communication group.

According to another embodiment, a method for identifying a communication group, the method being performed within a communication group within which a member communicates with one or more other members of the communication group and exchanges control information with one or more other members, may have the step of: creating an identification information and transmitting the identification information on a physical layer of the control information so as to assign the identification information to the communication group.

According to yet another embodiment, a non-transitory digital storage medium may have a computer program stored thereon to perform the inventive method, when said computer program is run by a computer.

Embodiments of the present invention provide a mobile device being a member of a communication group. The mobile device is configured to communicate with one or more other members of the communication group (e.g., using a sidelink) and to exchange control information with the one or more other members. The mobile device is configured to create (or to compile) an identification information as well as to transmit (distribute) the identification information on a physical layer of the control information (e.g., on the physical layer in the control channel). The identification information assigns the communication group (e.g., enabling to identify the communication group and/or the individual member within the communication group. Note that the identification information may be adaptive to the application/scenario.

Embodiments of the present invention are based on the principle that the usage of lower layers for the group ID management, e.g., a physical layer, enables to fulfill the latency constraints. Based on this general idea, low latency variants on how to assign group IDs/group internal IDs, which may be used especially for low latency demanding use cases, are based. This principle can be used for groupcast management, e.g., Rel-16 for V2X using NR.

According to embodiments of the present invention, the mobile device is a group head of the communication group. The communication group can be a platoon communicating to each other using V2X, wherein the other members of the group are so-called group members. According to a further embodiment, the mobile device may also be a group member, e.g., a group member of a platoon. Here, a so-called decentralized groupcast (all members are equal) approach can be used.

According to embodiments, the control information uses the SCI format. For example, the identification is inserted into one or more reserved information bits, of the SCI format. According to further embodiments, the identification information is inserted into the control information by scrambling or multiplexing the control information with the identification information (e.g., SCI information with the group ID).

According to embodiments, the identification information is out of a group comprising a group destination ID, a group source ID, a group destination and a group source ID in combination and a common group ID. According to further embodiments, the identification information is composed of a cell/zone/geographical reference of the group and/or a unique ID of the group within the geographical area.

According to further embodiments, a so-called radio temporary identification information or network temporary identification information is used as identification information. The radio/network temporary identification information may be dependent on a certain area or geographical reference. According to embodiments, the mobile device may be configured to define the radio/network temporary identification information. According to a further embodiment, a so-called sidelink identification information may be used as identification information. Here, the mobile device may be configured to define the sidelink identification information during a setup phase. According to embodiments, the radio/network temporary identification information or the sidelink identification information may be generated by the mobile device which acts as group head, if the communication group or at least a member of the communication group is out of coverage or in idle mode. This enables—even if network or the base station of the network could not serve the identification information—to have a clearly defined identification. The generation may be based on an application group ID or a PN sequence number. Note that, according to further embodiments, the radio/network temporary identification information or the sidelink communication information may be updated, if the network and/or the tracking area changes.

According to embodiments, the mobile device or each member of the group may be configured to generate an additional group member identification, e.g., according to the order of the platoon. In this case, the global group member identification may be—according to embodiments—composed of a network reference, a cell/zone/geographical reference and/or a unique identification of the group within the geographical area and/or a unique identification of each group member within the group.

Another embodiment provides a method for identifying a communication group. The method can be performed within a communication group within which a member communicates with one or more other members of the communication group (e.g., via sidelink) and exchanges control information with one or more other members. The method comprises the step of creating an identification information and transmitting (distributing) the identification information on a physical layer of the control information (on the physical layer in the control channel) so as to assign the identification information to the communication group (enabling to identify the communication group and/or the individual member within the communication group). Another embodiment provides a computer program for performing this method.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
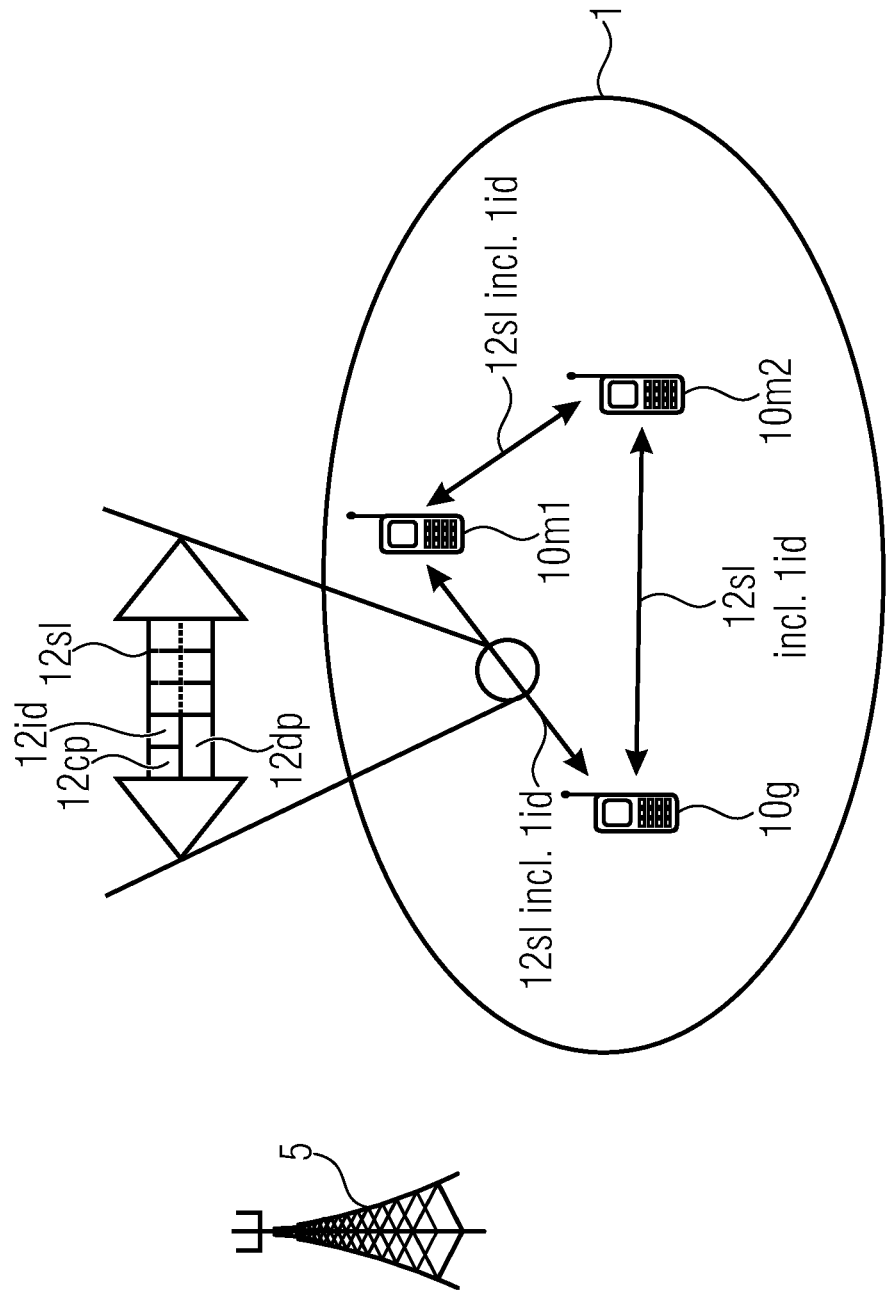
FIG. 1a shows a communication device of a communication group to be identified according to a basic embodiment.

Below, embodiments of the present invention will be subsequently discussed referring to the enclosed figures, wherein identical reference numerals are provided to objects having identical or similar function, so that the description thereof is interchangeable and mutually applicable.

FIG. 1a shows a communication device 10g, which could be, for example, part of a communication group 1 comprising the communication device 10g as well as one or more further communication devices 10m1 and 10m2. The communication device 10g may be the group head of the communication group 1, while the other communication devices 10m1 and 10m2 are group members of the communication group 1.

In this embodiment, it is assumed that the communication devices 10g, 10m1 and 10m2 communicate to each other using sidelink communication (cf. 12sl).

In the surrounding of the group one base station 5 is illustrated. Since a plurality of groups may be in the surrounding of the base station 5 or since a plurality of groups may be present, it would be beneficial to identify clearly the group. This especially helps the user equipments 10g to 10m2 to communicate with each other. Therefore, according to an embodiment, the sidelink communication 12sl includes an ID, e.g., a group ID 1ID. According to advantageous embodiments, the sidelink communication 12sl comprises at least two parts, namely a control portion 12cp and a data portion 12dp. The control information 12cp and the data portion 12dp may be arranged within different sub-resource pools (BWP, bandwidth portions) as it is illustrated by the enlarged view of the sidelink 12sl. It should be noted that the resources used for the sidelink are, for example, assigned by the base station 5 or preconfigured/preassigned resources. A part of the resources can be used for the control information (cf. part 12cp). It should be noted that it is not required for all embodiments that separate bandwidth portions are available for the control portion 12cp and the data portion 12dp. Within this sidelink 12sl, another information is exchanged, namely the ID, one ID of group 1. As it is illustrated within the enlarged view of the sidelink 12sl, the ID can be part of the control portion 12cp or can have its own portion. Therefore, the additional portion 12id carrying the group ID 1ID is marked within the large view of the sidelink communication. According to embodiments, the ID 1ID is exchanged between the mobile devices 10g, 10m1 and 10m2 using a physical layer, advantageously a physical layer of the control channel (cf. 12cp). Often, but not necessarily, the control information uses the so-called SCI format so that the identification information 1ID can be inserted into reserved bits. Another variant is to scramble or multiplex the control information 12cp with the identification information 12ID. It is beneficial within some embodiments that the identification information is available within a physical layer which reduces the latency.

Figure 1B:
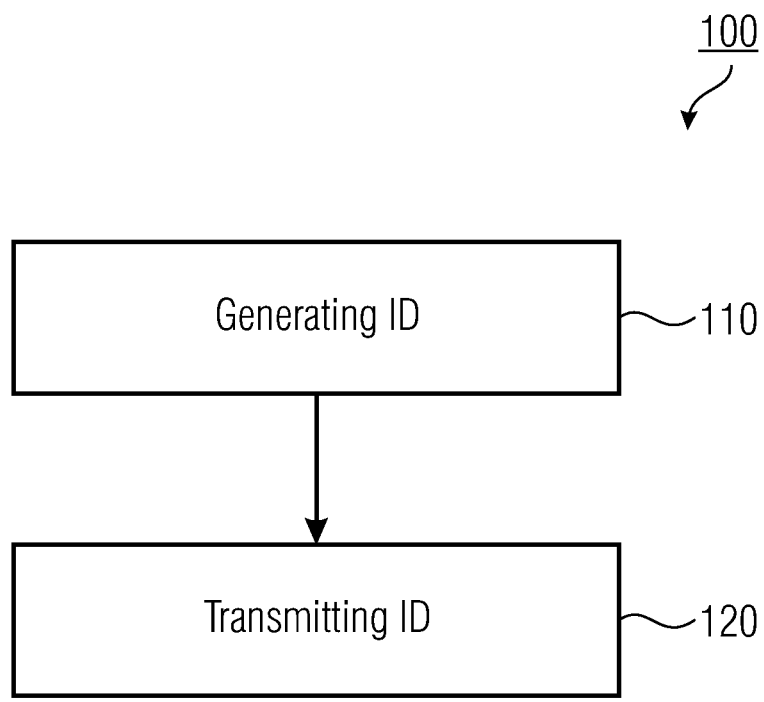
FIG. 1b shows a method for identifying a communication group according to a basic embodiment.

As it is illustrated by FIG. 1b, the mobile device, e.g., the mobile device 10g as group head, uses the following method for generating and exchanging the identification information 1ID/12ID. The method 100 comprises the two basic steps 110 and 120. Within the first step 110, the identification information 1ID is created/compiled. After that the identification information 1ID is transmitted or in general distributed as it is illustrated by the step 120.

According to embodiments, there are different approaches for generating 110 the ID 1ID. For example, the identification information 1ID may be based application group ID or PN sequence ID. Another variant is that the network reference, a cell/zone/geographical reference or a unique identification of the group within the geographical area or unique identification of each group member within the group may be used for the compilation. Background thereof is that the ID 1ID may, according to embodiments, not necessarily be the group ID. It can also be (alternatively or additionally) group member identification (additional group member identification which depends on the order of the mobile device/platoon member within the group 1/platoon). Note, advantageously both IDs/communication group ID and individual member ID are included in order to enable identify the communication group and the individual member within the communication group.

Regarding the step 120, it should be noted that same is performed, such that the identification information 1ID is transmitted on a physical layer 12ID as it has been discussed in context of FIG. 1a. It should be additionally noted that there are different types of exchanging the control information 12cp and identification information 12ID, e.g., unicast, groupcast/multicast or broadcast.

With regard to above embodiments, it should be noted that although the embodiment of FIG. 1a has been illustrated as a group 1 being in coverage or being partially in coverage of the base station 5, the discussed principle, especially the method as it has been discussed in context of FIG. 1b can also be applied to communication scenarios, wherein the group 1 or at least part of the group is out of coverage of the base station 5.

Below, additional embodiments will be discussed with respect to FIGS. 2a and 2b.

Figure 2A:
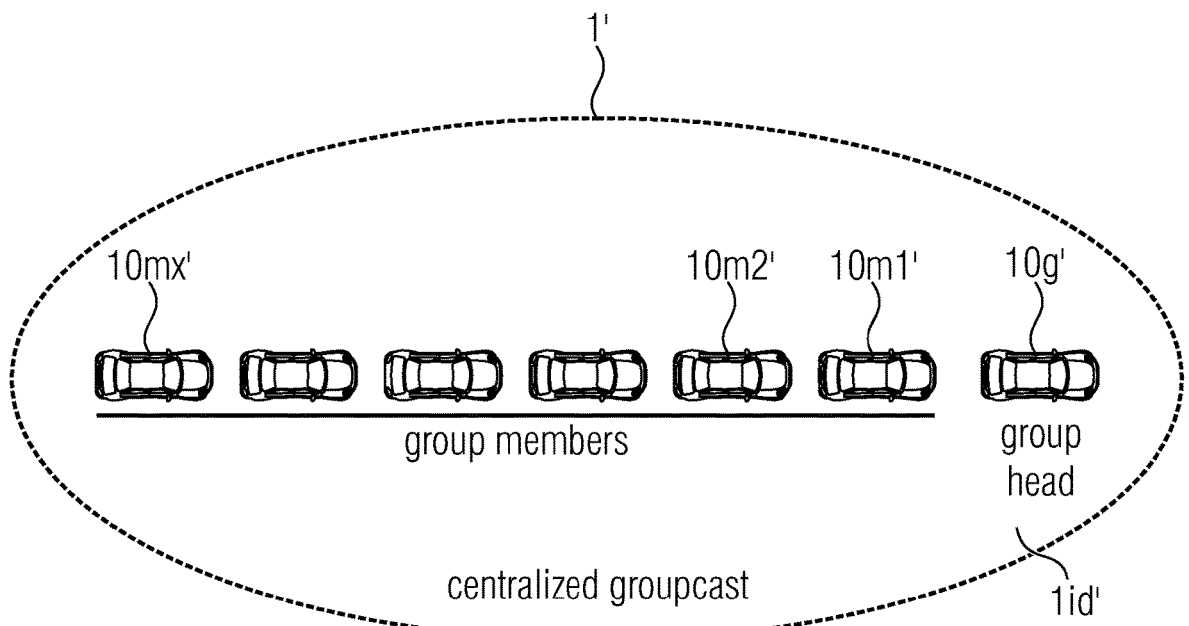
FIG. 2a schematically illustrates the principle of centralized groupcast according to an embodiment.

FIG. 2a shows a centralized group 1' having a group head 10g' and a plurality of group members 10m1' to 10mx'. As it is illustrated, a platoon 1' may consist of platoon head 10g' and platoon members 10m1' to 10mx'. The platoon members 10m1' to 10mx' follow the platoon head 10g1' at a (pre) defined or fixed or adapted distance and with a (pre)defined or fixed or adapted speed. For the following description of the solution, a few groupcast related terms are initially defined: The group ID 1ID' identifies the group 1'. Each group member 10m1' to 10mx' as well as the group head 10g' should advantageously know the group ID 1ID' of the group(s) 1' it belongs to. One example of the group ID 1ID' is the platoon ID. Typically, each group consists of one (or usually) multiple group members: group head 10g'/gh: per group there might be one group head 10g' taking over some controlling function within the group 1', i.e., using a centralized group management.

Figure 2B:
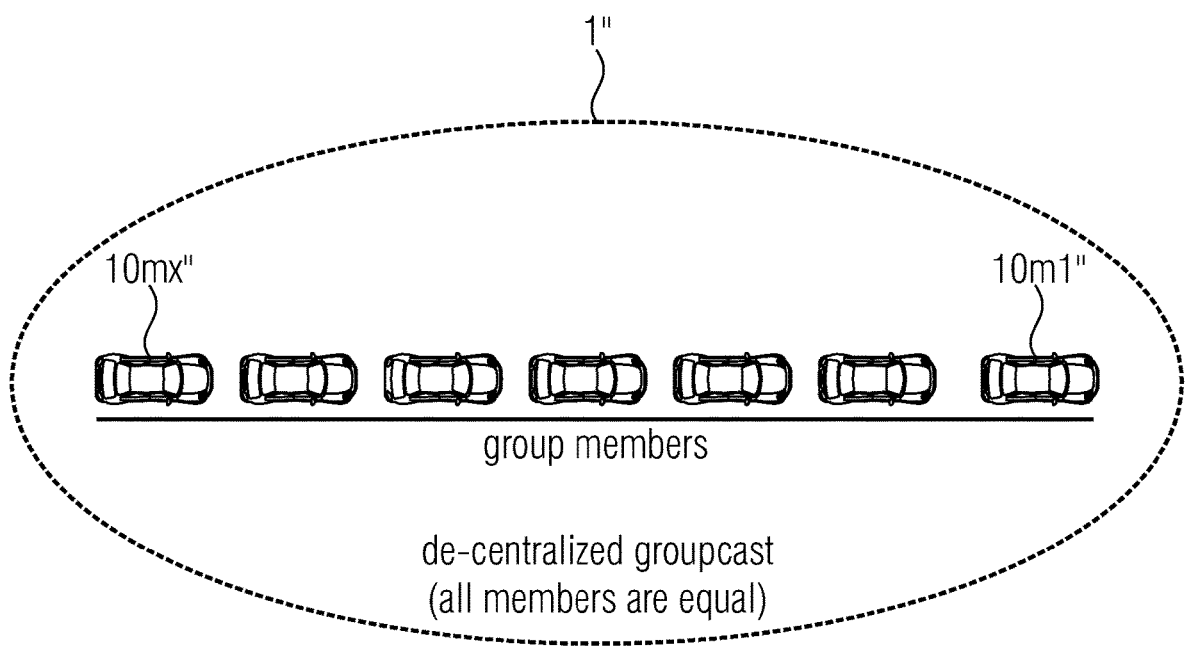
FIG. 2b schematically illustrates the principle of decentralized groupcast according to another embodiment.

According to other embodiments, a group without group head can also be used as it is illustrated by FIG. 2b. FIG. 2b shows a platoon comprising the group members 10m1" to 10mx" which all belong to the same group 1". Here, within this decentralized group approach, all members 10m1" to 10mx" are equal.

Below, for these platoons, two ideas having three variants of how to improve and accelerate the group ID assignment by using lower layers will be discussed.

The group ID refers to either of the below:
Group Destination ID
Group Source ID
Group Destination and Source ID (combination of both)
Common Group ID (unique identification)
Note that sidelink (SL) refers to D2D sidelink, M2M sidelink or V2X sidelink.

According to embodiments, the ID, e.g., the group ID can be transferred using the sidelink control channel PSCCH, e.g., within the SCI format. Here, changes in the sidelink control channel PSCCH and the SCI format are made to satisfy the latency requirements. According to embodiments, a group ID or, in general, an ID is added in the SCI format 1. There are reserved 32 information bits set to 0 out of which all or some (e.g., 8) bits can be used to define a group ID or in general an ID which could be configure (set by the application layer (first variant)).

According to another variant (2) providing another/enhanced embodiment it is possible to scramble the SCI information or part of the SCI information with the respective ID, e.g., the group ID.

Another embodiment provides a third variant: for the group ID/ID a new RNTI is introduced, e.g., called. The "group sidelink (GSL)"-RNTI can be defined during the group setup and is typically unique for a certain area (e.g. within a certain network, cell, or zone, if in coverage).

According to embodiments, the, e.g., group RNTI or GSL-RNTI, is selected for a network connected group head or group-head and multiple members According to embodiments, in an incoverage scenario the RNTI, e.g., group RNTI or GSL-RNTI, and further invinted RNTI, e.g., group RNTI or GSL-RNTI, in this document may be mapped to the network identifiers According to embodiments, once the GH is out of coverage, a temporary local RNTI, e.g., group RNTI or GSL-RNTI, can be considered until the next in coverage.

According to embodiments, once the UEs are in coverage again, either this local RNTI, e.g., group RNTI or GSL-RNTI, can be mapped to the network new RNTI or update the group RNTI, e.g., group RNTI or GSL-RNTI, once the RRC is connected.

Below, an out of coverage (idle mode scenario will be discussed). If the UE is out of coverage or in idle mode (NR2-like) a GSL-RNTI may be generated by the group head (GH) and distributed to the other group members (GMS). For example, this can be a PN sequence number. Alternatively/additionally, the (known) application layer group ID (e.g., as used in CAM or DENM message (is used as a source for the generation of the, e.g., GSL-RNTI.

According to embodiments, the method may be adapted for the network/tracking area change scenario as it follows:

If the network and/or the tracking area changes, the GSL-RNTI may be updated by the current group head. The updating may be performed by the group head, the (resent) network controller or by a combination of both (e.g. by the head, while the network controller assists).

Below, embodiments for the global group (member) ID will be discussed: a unique global group ID within one network uniquely identifies each group and each group member within a network. It may—according to embodiments—be composed of at least of the following information:

1. Cell/zone/etc. ID: geographical reference of the group
2. Group ID: unique ID of the group within the geographical area
3. Group internal ID: unique identification of each GM within the group According to embodiments, within each group (same Group ID), each group member is identified by a group internal ID For platoons (or any other group, where the position of the GM within the group is important), the group internal ID can represent the the sequence of the vehicle in the platoon. This improves the fast and easy tracking of the vehicles within the platoon, e.g. first, middle, last position of the vehicle within the platoon.

Whenever the position of the vehicle within the platoon changes, the group internal ID may be updated accordingly.

According to a further embodiment, the group member ID can be composed of one of the following elements:

The group ID and the member unique ID (C-RNTI, V-RNTI, V2X RNTI).

If the network RNTI is not available (especially for out of coverage cases) the group member ID is composed of the group ID (e.g. selected from a PN-sequence generator) plus a unique identifier for each GM.

Below, some examples will be given:

One platoon groupcast (group ID x) with 3 group members (3 vehicles following each other) could have the following group member IDs:

GH: group ID (XYZ)+group member internal ID (01) =XYZ01

$1^{st}$ GM: groupcast ID; x, group member internal ID (02)=XYZ02

2nd GM: groupcast ID; x, group member internal ID (03)=XYZ03
Note: The group member internal IDs could represent the vehicle order in the platoon The solution is partly described for the platooning use case, which is seen as the most prominent use case for groupcast in V2X. However, the solution is neither limited to platooning nor to V2X, but is applicable to groupcast in 5G groupcast management in general.

If included in the TS, this invention has to be used to allow V2X groupcast to work in 5G NR.

Further technical areas are: V2X groupcast to allow efficient low-latency assignment and modification of the group ID and the GM group internal ID.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ABBREVIATIONS

| Abbreviation | Meaning |
| --- | --- |
| NR | New Radio |
| DSRC | Dedicated Short Range Communication |
| SLR | Service Level Requirements |
| CAM | Cooperative Awareness messages |
| DENM | Decentralized Environmental Notification |
| PSCCH | Physical Sidelink Control Channel |
| SCI | Sidelink Control Information |
| PN | Pseudo random Number |
| ACK/NACK | Acknowledgement/Negative Acknowledgement |
| DMRS | Demodulation Reference Signals |
| S-RSRP | Sidelink-Received Signal Strength |
| GSL | Group Sidelink |
| GH | Group head |
| GM | Group member |
| RNTI | Radio Network Temporary ID. Note that dependent on the use case gNB assisted communication Network pre-configurations out of coverage the Radio Network Temporary ID may have a different name, e.g., group RNTI or GSL-RNTI |

REFERENCE LABELS

| Number | Details |
| --- | --- |
| [1] | TR 22.886 |
| [2] | TR 36.885 |
| [3] | TS36.212 |

The invention claimed is:

1. A device comprising:
a communication circuit that is configured to communicate with one or more other members of a communication group and to exchange control information with the one or more other members,
wherein the device is configured to create an identification information and to transmit the identification information on a physical layer of the control information,
wherein the identification information identifies the communication group,
wherein the control information uses the Sidelink Control Information (SCI) format, and
wherein the identification information is inserted into one or more of reserved information bits of the SCI.

2. The device according to claim 1, wherein the device is a group head of the communication group.

3. The device according to claim 1, wherein the identification information is inserted into the control information by scrambling or multiplexing the control information with the identification information.

4. The device according to claim 1, wherein the identification information comprises at least one of: a group destination ID, a group source ID, a common group ID, and a side link identification information.

5. The device according to claim 1, wherein the identification information comprises one of: a radio/network temporary identification information, or a side link identification information.

6. The device according to claim 5, wherein the device is configured to define the radio/network temporary identification information or the side link identification information during a setup phase.

7. The device according to claim 5, wherein the radio/network temporary identification information or side link identification information is generated by the device as group head.

8. The device according to claim 5, wherein the radio/network temporary identification information or the side link communication information is updated if the network and/or the tracking area changes.

9. The device according to claim 5, wherein the radio/network temporary identification information is dependent on a certain area or geographical reference.

10. The device according to claim 5, wherein the radio/network temporary identification information or the side link identification information is generated based on an application group ID or a PN sequence number.

11. The device according to claim 1, wherein the device or each member is configured to generate an additional group member identification.

12. The device according to claim 11, wherein the additional group member identification is composed of a network reference, a cell/zone/geographical reference and/or a unique identification of the group within the geographical area and/or a unique identification of each group member within the group.

13. The device according to claim 1, wherein the identification information is transmitted to the one or more other members on the physical layer of the physical sidelink control channel PSCCH such that the identification information is directly transmitted to the one or more of the members on the physical layer of the physical sidelink control channel PSCCH.

14. The device according to claim 1, wherein the identification information comprises a cell/zone/geographical reference of the group and/or a unique ID of the group within the geographical area.

15. A method for identifying a communication group, the method comprising:
creating an identification information that identifies the communication group and
transmitting the identification information on a physical layer of the control information so as to assign the identification information to the communication group,
wherein the control information uses the Sidelink Control Information (SCI) format, and
wherein the identification information is inserted into one or more of reserved information bits of the SCI.

16. A computer program stored on a non-transitory digital medium, wherein the computer program when executed on a processor performs the method as claimed in claim 14.

* * * * *